May 6, 1941.                 E. T. LESSIG                 2,240,505
METHOD OF AND APPARATUS FOR FATIGUE-TESTING FILAMENTARY ARTICLES
Filed Nov. 29, 1938
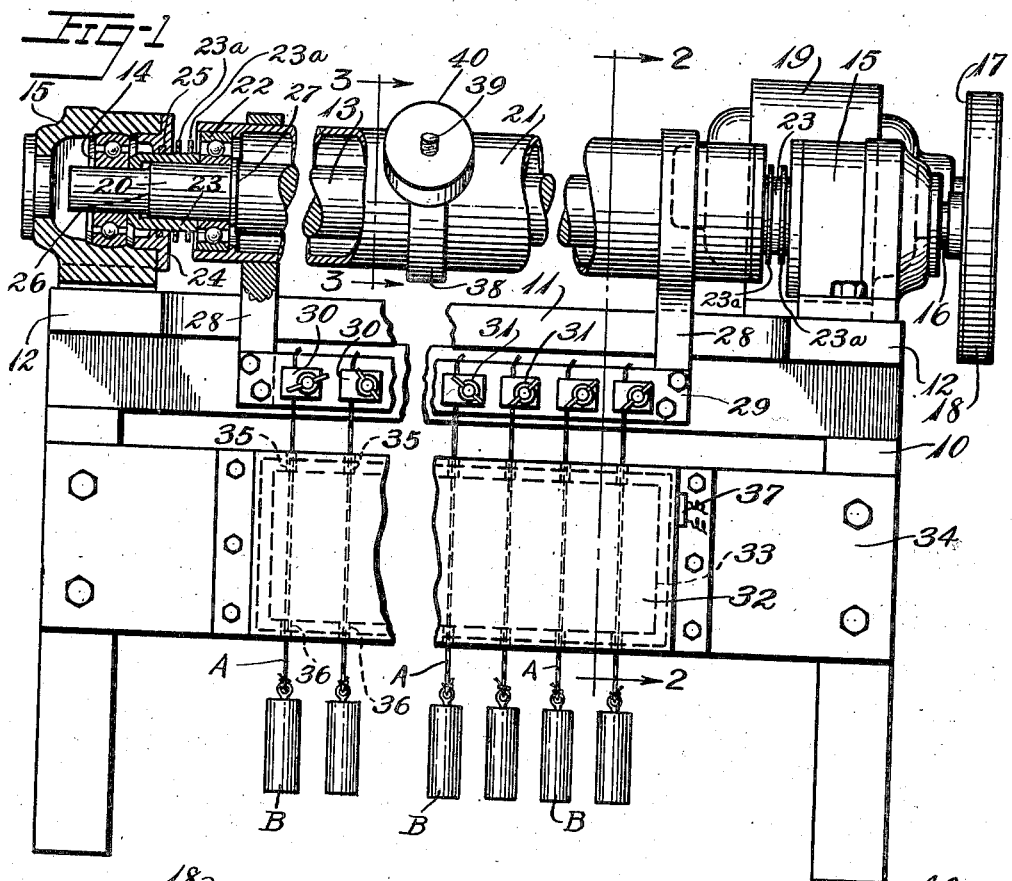
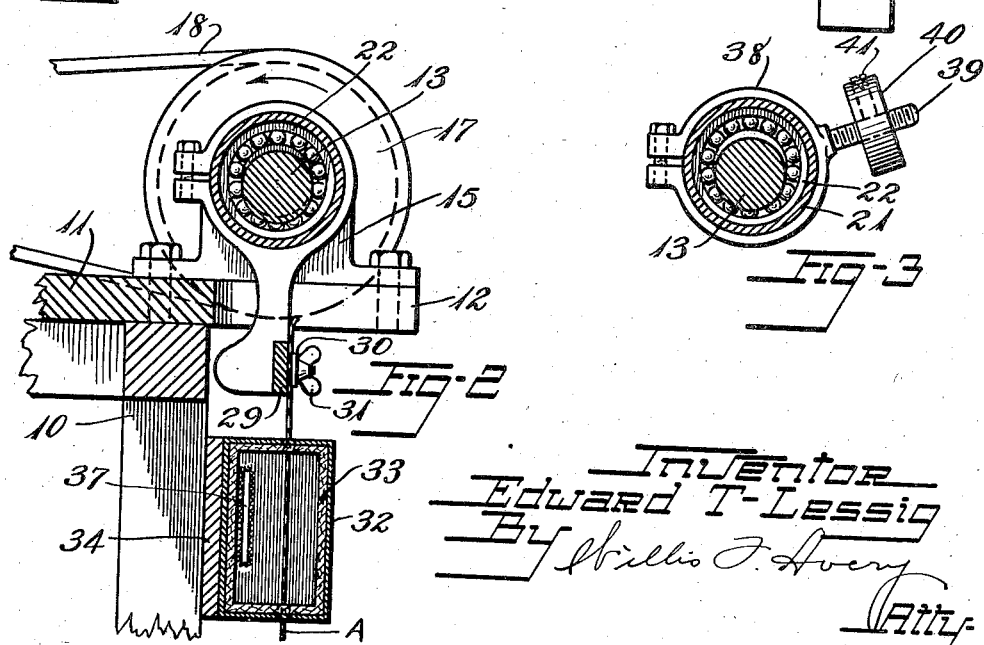
Inventor
Edward T. Lessig
By Willis T. Avery
Atty.

UNITED STATES PATENT OFFICE 2,240,505

METHOD OF AND APPARATUS FOR FATIGUE-TESTING FILAMENTARY ARTICLES

Edward T. Lessig, Akron, Ohio, assignor to The B. F. Goodrich Company, New York, N. Y., a corporation of New York Application November 29, 1938, Serial No. 242,957

3 Claims. (Cl. 73—51)

This invention relates to determining the suitability of articles such as tire cords and the like for resisting vibration and cyclic stresses.

The normal life of a tire casing ordinarily terminates when the tire cords rupture, the breakage of a few cords usually being quickly followed by failure of remaining cords in the same zone of the tire owing to the excessive transfer of load to the cords not yet broken. It is therefore desirable to prevent failure of any of the cords throughout as long a period as possible.

Heretofore it has been common practice to select cord for use in tires largely on the basis of tensile strength. It has been found, however, that tensile strength of itself is not a reliable indication of the suitability of cord for this use, and in some cases it has even been found that the tensile strength of the cord has actually increased in value during a period of use of the tire while the fatigue resistance of the cord has in fact decreased.

As a result of my investigations leading up to the present invention I have found that the fatigue resistance of cords depends to a very large extent upon the ability of the cords to resist vibration and cyclic stresses, and that mere tensile strength of the cords, commonly used as an indicator heretofore, is not reliable for determining the fatigue resistance of tire cord. The ability of a cord to withstand vibration and cyclic stresses as indicated by the procedure and apparatus of this invention is correlated with surprising closeness to the ability of tire cord and tire fabric to withstand breakdown as determined by mileage tests of tires in use. Thus the invention makes possible a more reliable and convenient method of determining the suitability of cord for use in tires and other structures subjected to vibration and cyclic stresses, such for example as transmission belts, vibration insulators, rubber springs and the like having a cord or fabric reinforcement.

While the action of the internal structure of the cord may not be fully known, apparently the resistance to fatigue under vibration and cyclic stresses depends upon the ability of the cord to resist fiber movement, including slippage of its fibers upon one another or distortion of the individual fibers, or both, under such action, this movement causing frictional heat and other deteriorating influence which when excessive is very weakening on cord material, whether it be cotton, rayon or other material.

The invention has for an object to determine expeditiously the ability of the cord or other filamentary article to resist deterioration under vibration and cyclic stresses. Related objects are to provide procedure for conveniently determining the fatigue resistance of tire cord and the like; and to provide apparatus for carrying out the test with facility.

These and further objects will be apparent from the following description, reference being had to the accompanying drawing in which:

Fig. 1 is a front elevation, with parts broken away and sectioned, of apparatus constructed according to and embodying the invention in its preferred form.

Fig. 2 is a section taken along the line 2—2 of Fig. 1.

Fig. 3 is a section taken along the line 3—3 of Fig. 1.

In accordance with the preferred procedure of the invention I subject a reach of the cord to an accelerated fatigue test by a procedure including suspending a weighted reach of the cord and subjecting such reach to vibration of low amplitude at a frequency for the sake of convenience of operation and greater uniformity of results, preferably above the natural resonance frequency of the weighted system. Reliable comparative tests of cords can be obtained by this method especially when the cords of equal or nearly equal lengths are tested under substantially equivalent conditions.

By way of example, good results have been obtained by using a suspended reach of the cord of about 8½ inches in length with a weight of five pounds supported by the cord, and vibrating the suspended reach through an amplitude of about $\frac{1}{32}''$ at a frequency well above the natural resonance frequency of the cord. With cords having a natural resonance frequency below 1,000 vibrations per minute it is preferred to impress a test vibration of several times that frequency. For example, with an amplitude of vibration of .032" and a load of 3.4 pounds, a frequency of 3600 times per minute has been impressed with good results, and with an amplitude of .064" and a load of 5 pounds, a frequency of 2700 vibrations per minute has been found suitable.

The best results have been obtained with the high frequency vibrations, this having facilitated close comparisons of nearly similar cords, and by using frequencies well away from the natural resonance frequencies of the cords, a number of cords of varying types can be tested simultaneously for comparison without the likelihood of having any cord affected by resonance frequency. While the high frequencies are thus preferred, in some cases it is feasible to test cords or other filamentary articles at frequencies below their natural resonance frequencies. By avoiding the natural resonance frequencies of the article I am able to determine more reliably their ability to resist cyclic stresses as distinguished from their tensile strength merely.

The length of the suspended reach of the cord, the weight supported, and the precise amplitude and frequency of the vibrations, all can be varied through considerable ranges without detracting from the reliability of the results, but for the best comparisons the cords should be tested under as nearly equivalent conditions as possible.

The test may be further accelerated, and the conditions of the test made to approach more nearly the conditions existing in a tire in use, by subjecting the vibrating cord to heat, preferably at a temperature within a range of temperatures comparable to those existing in a tire in use. A temperature at or about 250 degrees has been found to be suitable for testing tire cord, although temperatures as low as 180° and as high as 320 have been regularly used for such cord, and the temperature may be varied through a considerable range, as desired. In order that the cord will not break prematurely at the position at which it is gripped and vibrated, this zone of the cord should be outside the zone to which heat is applied. To this end and for the sake of economy of operation the heated zone preferably is confined to only a portion of the vibrating reach of the cord.

Referring to the drawing, apparatus is shown for carrying out the invention conveniently and with uniform results. A suitable frame support 10 supports a top 11 having forwardly projecting portions 12, 12 at its sides for supporting a vibrating mechanism in suspended fashion between these portions. A shaft 13 extends over the portions 12, 12 and is supported by bearings 14, 14, preferably of the ball bearing or other low friction type, and mounted in housings 15, 15 supported by the portions 12, 12. The two housings 15, 15 are the same in construction, except that the one shown at the right in Fig. 1 is apertured for the passage of the adjacent end 16 of the shaft through it so that the shaft may be driven by a pulley 17 mounted upon it and having a belt 18 connecting it with a driving motor 19.

Except for this shaft extension the two end portions of the shaft are identical and each end portion comprises an eccentric portion 20 upon which a tube or sleeve 21 is supported by means of bearings 22, 22 which may also be of the ball bearing or other low friction type. Spacing rings 23, 23 are interposed axially between the respective pairs of bearings 22—14, 22—14. Each of these rings is of an eccentric form complemental to the eccentricity of the shaft portion 20 and each ring has a cylindrical outer surface so that it is adapted to ride within the cylindrical aperture of a closure plate 24 of the housing so that the housing will remain closed. The closure plate may include a packing ring 25 engageable with the ring 23 and the latter may be provided with circumferential ribs 23a, 23a to prevent undesirable migration of lubricant used in the housing. A shoulder 26 and a collar 27 at each end portion of the shaft serve in cooperation with adjacent parts to keep the mechanism axially positioned.

Suspended from the sleeve 21 by means of straps 28, 28 and moving vertically with the sleeve 21 when the latter vibrates by operation of the eccentric is a cross bar 29 secured to the straps. Upon the cross bar are mounted a plurality of clamps or gripping elements 30, 30 which may be manipulated by butterfly nuts 31, 31 for the purpose of gripping cords to be tested. Such cords are indicated at A, A which support weights B, B in freely suspended fashion. It will be seen that the length of the vibrating reach of each cord extends from the clamp 30 down to the weight B.

A heating chamber 32, which may be in the form of a box having an insulated lining 33, is mounted upon a frame supporting member 34 in a position such that the suspended cords A, A may pass through the heated chamber. Suitable apertures 35, 35 and 36, 36 are provided in the upper and lower walls of the heater 32 for the passage of the cords therethrough, such apertures being preferably of such small size as to make it difficult for heated air to leak by the cords and yet of large enough size so that the vibrating cord does not rub against the heater walls at the apertures. A heating element 37 preferably electrical, is mounted in the chamber 33 to supply heat to the portions of the cords within the chamber.

Inasmuch as it is impossible to eliminate entirely the friction of rotating parts in contact, even with low friction bearings, there will be a tendency for the driving torque on the shaft 13 to cause a rotation in the same direction of the sleeve 21, and in order to counteract such effect to maintain the sleeve 21 against rotation so that the cords will be centered in the heating chamber, a strap 38 is mounted centrally upon the sleeve 21 and is provided with an outwardly extending screw 39 carrying a weight 40 in such disposition with relation to the sleeve as to provide a mechanical moment to counteract the effect of the driving torque on the sleeve 21. The weight 40 is adjustable upon the screw 39 and may be held in adjusted position as by a set screw 41.

In the operation of the apparatus, before starting the rotation of the shaft 13 the test cords A, A with their weights B, B are gripped in the clamps 30, 30 preferably so that the suspended reaches of the cords are of a uniform, determinate length. The weights are then lifted so that the cords will be unloaded until the apparatus is brought up to the desired speed for testing. This is to avoid subjecting the cords to a load through their natural resonance frequency so that their strength may be preserved for testing at the higher frequency for more reliable comparison. Rotation of the shaft 13 is then started and is brought up to the desired speed, whereupon the weights B, B are gently lowered to be supported entirely by the suspended cords. The amplitude of vibration preferably is small as hereinabove described, and by maintaining the frequencies well above the natural resonance frequency of the cords the weights B, B remain substantially stationary while the gripped portions of the cords move with the impressed vibration so that the suspended reaches of the cords are subjected in effect to an alternating pushing and pulling action or cyclic vibration very similar to the action the cords undergo in a tire casing in use. The heating chamber 32 is preferably maintained throughout the test at a temperature comparable to that existing in structures for which the cords are intended.

Variations may be made without departing from the spirit of the invention as it is defined by the following claims.

I claim:

1. Accelerated fatigue-testing method for filamentary articles such as tire cord and the like, which method comprises the steps of freely suspending a weighted reach of the article and subjecting the suspended portion of said reach to vibration of low amplitude at a frequency above the natural resonance frequency of the weighted system such that the freely weighted portion of said reach remains substantially stationary while the suspended portion of said reach moves with the impressed vibration.

2. Apparatus for accelerated fatigue-testing of filamentary articles such as tire cord and the like, said apparatus comprising means for freely suspending a weighted reach of the article, means for impressing upon said reach a vibration of low amplitude at a frequency above the natural resonance frequency of the weighted system such that the weighted portion of said reach remaining substantially stationary while the suspended portion of said reach moves with the impressed vibration, and means for heating only an intermediate freely vibrating portion of the weighted reach during the vibration thereof.

3. An apparatus for accelerated fatigue-testing of filamentary articles such as tire cord and the like, said apparatus comprising a rotatable shaft having an eccentric portion, means for rotating the shaft, an article-supporting structure mounted upon said shaft and in engagement with said eccentric portion to transmit linear movement to the article upon rotation of the eccentric, and means for restraining rotation of the article-supporting structure as a result of the frictional engagement with said eccentric portion during rotation of the shaft, said article-supporting structure being freely suspended upon the eccentric portion of said shaft and the rotation resisting means comprising an adjustable inertia member mounted to counteract the rotational effect of the eccentric upon the article-supporting structure as a result of frictional contact of said eccentric and structure.

EDWARD T. LESSIG.